United States Patent [19]

Kabler et al.

[11] Patent Number: 4,462,689

[45] Date of Patent: Jul. 31, 1984

[54] WIDE BAND SCANNING MONOCHROMATOR

[75] Inventors: Milton N. Kabler, Alexandria; Richard T. Williams, Fairfax, both of Va.; Jack C. Rife, Washington, D.C.; William R. Hunter; Johnny P. Kirkland, both of Springfield, Va.; Neil C. Lien, Evansville, Wis.

[73] Assignee: Baker Manufacturing Company, Evansville, Wis.

[21] Appl. No.: 398,090

[22] Filed: Jul. 9, 1982

[51] Int. Cl.³ ............................................. G01J 3/18
[52] U.S. Cl. .................................. 356/333; 250/372; 356/334; 378/85
[58] Field of Search ............................. 356/331–334, 356/305, 328; 250/372; 378/84, 85

[56] References Cited

U.S. PATENT DOCUMENTS 3,546,453 12/1970 Browning et al. ..................... 378/85
3,822,941 7/1974 Roche et al. ......................... 356/334
4,365,156 12/1982 Golovchenko et al. ........ 356/334 X

OTHER PUBLICATIONS

Kov'ev et al., Sov. Phys. Crystallogr. vol. 19, No. 5, Mar.-Apr. 1975, pp. 656-659.

Primary Examiner—F. L. Evans
Attorney, Agent, or Firm—Isaksen, Lathrop, Esch, Hart & Clark

[57] ABSTRACT

A scanning monochromator is disclosed which is capable of operation over a wide bandwidth in an ultra-high vacuum. The monochromator includes a pair of carousel assemblies carrying the optical elements which may be independently positioned translationally along the optical axis of the instrument and also rotationally, which each positioning control operable from outside of the instrument. A carousel on each of the carousel assemblies carries several optical elements and is rotatable to change which optical element is used, also from outside of the instrument.

14 Claims, 10 Drawing Figures

WIDE BAND SCANNING MONOCHROMATOR

TECHNICAL FIELD

The present invention relates to monochromators used in optical physics, in general, and, in particular, to a monochromator designed to operate in an ultra-high vacuum and capable of scanning operation through a wide frequency range.

BACKGROUND OF THE INVENTION

A monochromator is a device utilized to selectively filter a single frequency from a beam of radiation and to selectively pass only radiation of the selected frequency on for further experimental use. Many conventional monochromators capable of operating in the ultraviolet and x-ray regions of the electromagnetic spectrum utilize a Rowland circle configuration with the incident light striking gratings, used to scatter the incident light, at a grazing angle. The major disadvantage of the Rowland circle configuration is the necessity for the continuous change in position of either the exit or the entrance path of light in the instrument as the instrument is scanned through various frequencies.

Another type of monochromator, capable of use in the x-ray region and having fixed entrance and exit locations, has been developed and is known as the double crystal monochromator. This type of monochromator, the typical optical path of which is similar to that illustrated in FIG. 2 of this patent application, focuses the entering light on a series of two oppositely oriented crystals so that radiation of the selected frequency arrives at the fixed exit location. An example of an illustration of such a monochromator can be found in *Nuclear Instruments and Methods*, Volume 172 pages 227–236, published in 1980. A similar monochromator was described in *The Review of Scientific Instruments*, Volume 52 (4), page 509, published in April of 1981. A grazing incidence monochromator based on the double crystal design but using diffraction gratings and capable of operating in the ultraviolet region has also been developed, as exemplified by the design shown in *The Review of Scientific Instruments*, Volume 43 (3) page 434 published in March of 1972. It is a limitation on each of these designs for monochromators that they are capable of operating only within a limited frequency range, either in the ultraviolet or x-ray regions, and that these designs are not inherently capable of operation in an ultra-high vacuum. Because many wavelengths within this general spectral region are strongly absorbed by air and by window materials capable of supporting partial or full atmospheric pressure, and because some of the most powerful and versatile sources of continuous ultraviolet and x-ray radiation, i.e. synchrotron radiation sources, operate strictly in ultra-high vacuum, it is important for an efficient operation of a monochromator operating in this region that the operation of the instrument be feasible in an ultra-high vacuum, in order to maximize the intensity of the radiation at the target site.

It is another desirable feature of a monochromator of the general type described here that it operate in what is known as the "blaze" condition. The blaze condition refers to the physical situation in which the radiation diffracted from the grating crystal is at its maximum intensity at the desired frequency. The condition for blaze operation using a grating is illustrated in FIG. 1. In FIG. 1, the reference designations $N_g$ and $N_f$ indicate angles which are perpendicular to the grafting surface and to the surface of the grating groove respectively. The angles $\alpha$ and $\beta$ are the angles of incidence and diffraction, respectively, of the light hitting the grating. The angles designated by $\sigma$ and $\sigma'$ are the angles of equal inclination relative to $N_f$ made by the incident light and the defracted light at the blaze wave length, respectively. In this figure, the grating spacing is indicated by D which is the inverse of the groove density as expressed in grooves per centimeter. FIG. 1A shows a similar incident and reflected beam in the case of Bragg Diffraction for a crystal. This comparison illustrates the essential similarity of the Bragg diffraction condition for a crystal where the path difference for rays reflecting from two successive crystal planes in $2D \sin \sigma$, and the on blaze diffraction condition for gratings in a monochromator of the type described here, where the path difference between rays reflected from adjacent groove facets is $2D \sin \theta_B \sin \sigma$.

In either of the conditions illustrated in FIGS. 1 and 1A, as long as $\sigma$ equals $\sigma'$, the grating or the crystal is operating at blaze condition, which is the condition for maximum efficiency and maximum intensity of the difracted wavelengths. It is desirable in a monochromator that the gratings or crystal be oriented so that the blaze condition is maintained throughout the entire spectral range of the instrument, by maintaining the condition that the angles $\sigma$ and $\sigma'$ are equal. Generally, conventional grating monochromators operate such that the grating is at a blaze condition only at one specific design wavelength, and thus the efficiency of the grating and the overall efficiency of the monochromator are at a maximum value only at this one selected wavelength. One monochromator has been described, in the above referenced article in the *Review of Scientific Instruments* in March, 1972, which operates continuously at a blaze condition, but only through a limited spectral range and only using a grating for a diffraction element. No grazing monochromator of previous design is known which is capable of operating at blaze over a wide spectral range and in an ultra-high vacuum environment.

Typically, double crystal monochromators for x-ray radiation operate in an environment of helium or some other inert gas. The use of a gas at or near atmospheric pressure in the monochromator simplifies the control of the mechanisms for adjusting the optical elements of the device. However, in order for radiation from a synchrotron to be introduced into such a non-vacuum monochromator, with synchrotrons normally operating in an ultra-high vacuum, the monochromator must be separated from the interior of the synchrotron by a metallic window, typically of beryllium. The x-ray absorption characteristics of beryllium then set a lower limit on the energy of the x-ray photons which can be handled by such a double crystal monochromator. By contrast, the efficiencies of gratings, and the extreme grazing angles at which they must be used usually, set an upper limit on the photon energies which can be used with a grating monochromator. The junction of these limitations, generally in the range of 1 to 2 keV, is an important spectral region not conveniently accessible using either of these types of equipment. No prior ultra-high vacuum monochromator is known to have been constructed which is capable of operating in both the x-ray and ultraviolet regions and capable of utilizing either crystals or gratings, or both, at alternative time periods, as the optical elements in its optical system.

SUMMARY OF THE INVENTION

The present invention is summarized in that a monochromator capable of operating over a wide spectral range and in an ultra-high vacuum includes: a pair of carousels each carrying thereon a plurality of deffracting optical elements, each of which is operable over a different spectral range; a linear translating mechanism for each carousel to position each carousel at any selected longitudinal position within the instrument; a rotational mechanism associated with each carousel to rotationally position the optical element on each carousel at any desired position; and a selecting mechanism capable of rotating each carousel so as to change the optical element which is inserted in the optical path of the instrument.

It is an object of the present invention to provide a monochromator capable of operating under blaze conditions in both the ultraviolet and x-ray regions of the electromagnetic spectrum.

It is another object of the present invention to provide such a monochromator which is capable of operation in an ultra-high vacuum while maintaining complete flexibility for positional control of the optical elements of the instrument from outside of the vacuum housing.

It is yet another object of the present invention to provide a mechanism for changing the optical elements of such an instrument through a mechanism operated from outside of the vacuum housing of the instrument.

Other objects, advantages, and features of the present invention will become apparent from the following specification when taken in conjunction with the accompanying drawings.

DESCRIPTION OF THE PREFERRED EMBODIMENT

Figure 3:
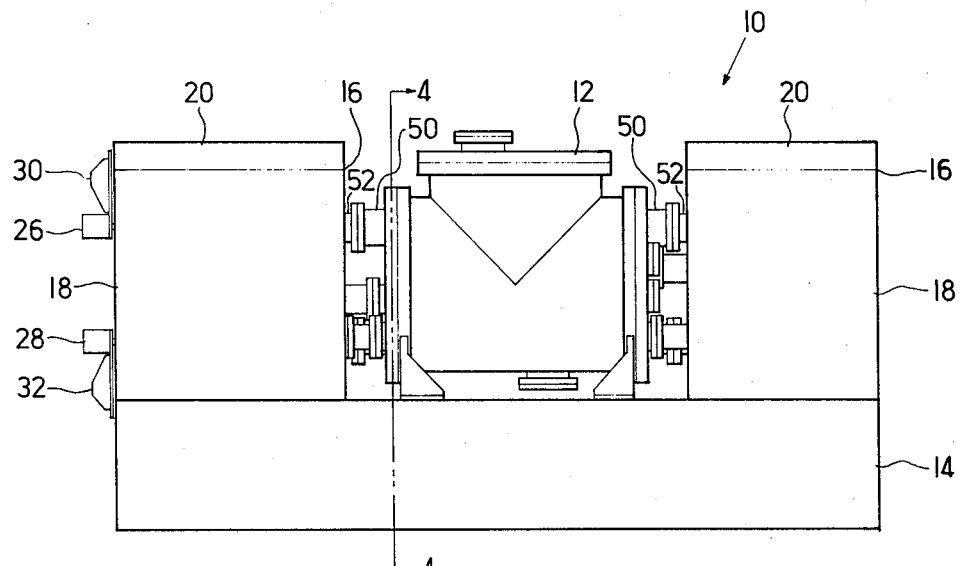
FIG. 3 is a side elevational view of the external casing of a monochromator constructed in accordance with the present invention.

Illustrated in FIG. 3, and generally indicated at 10, is an extended range monochromator constructed in accordance with the present invention. The optical elements of the monochromator are contained within a vacuum housing 12 which is firmly fixed on a large mounting block 14, which is preferably constructed from a large monolithic piece of granite. At each end of the mounting block 14 a pair of base end assemblies 16 are provided. Each of the base assemblies 16, also preferably constructed out of monolithic pieces of granite, consists of two side pieces 18 joined by a bridging top piece 20 which spans between the two side pieces 18. All the elements of the base end assemblies 16 are firmly fixed together. As can be seen by referring to FIG. 5, on the upper and lower surfaces on the interior of each of the base assemblies 16 are mounted respective upper and lower air bearing surfaces 22 and 24. These surfaces are fixed in place on the respective base assemblies 16. On the left hand of the two base assemblies 16, as viewed in FIG. 5, which is the entrance side of the instrument, respective stepping motors 26 and 28 are mounted on respective stepping motor mounts 30 and 32 which are also fixed to the top piece 20 and mounting block 14 respectively. A respective drive shaft 34 and 36 emerges from each of the stepping motors 26 and 28. Each of the drive shafts 34 and 36 is held in place on the respective stepping motor mounts 30 and 32 and is, in turn, connected to a respective one of two threaded drive shafts 38 and 40.

Figure 4:
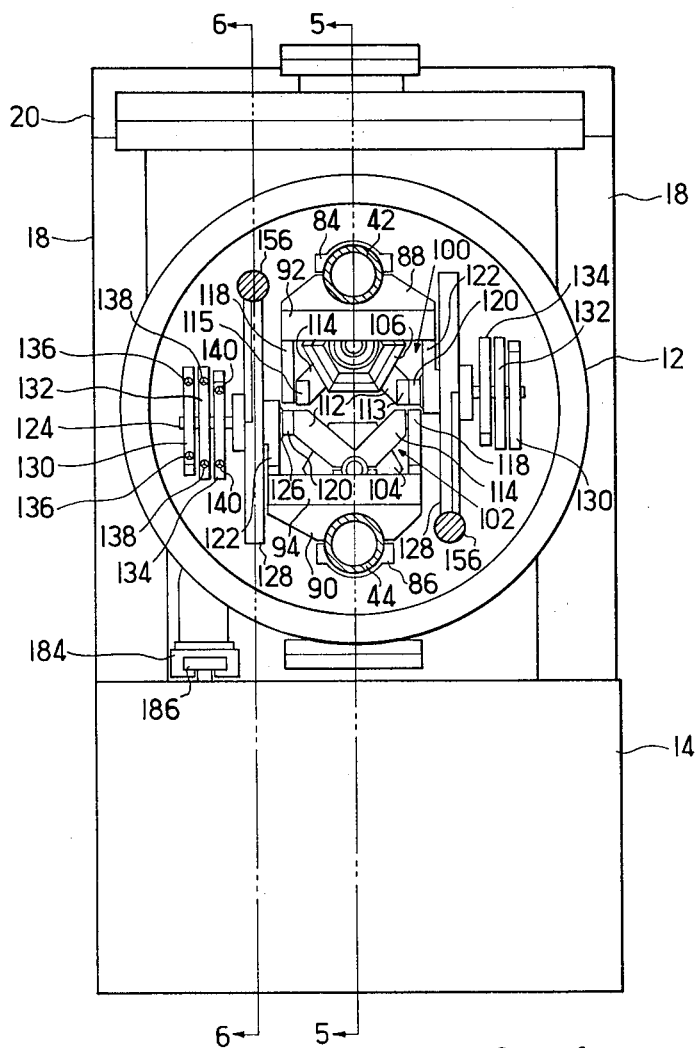
FIG. 4 is a cross-sectional view taken along the line 4—4 in FIG. 3.
Figure 5:
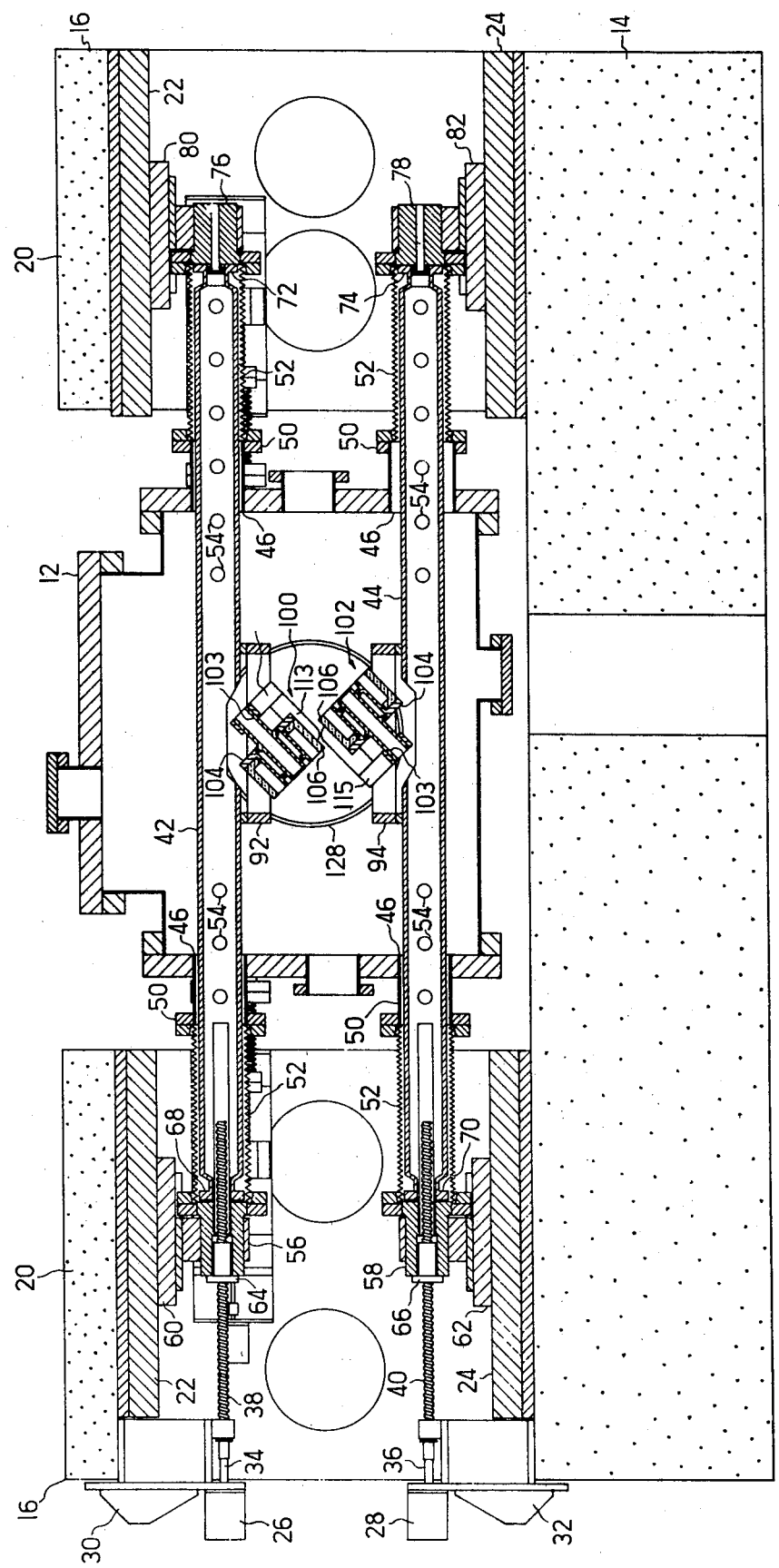
FIG. 5 is a cross-sectional view taken along the line 5—5 in FIG. 4.

Best seen in FIGS. 4 and 5 are parallel upper and lower support rods 42 and 44. Each of the support rods 42 and 44 is a horizontally extending hollow cylindrical column extending generally between the two base end assemblies 16 through the vacuum housing 12. Suitable ports, all indicated at 46, are provided in the sides of the vacuum housing 12 so as to allow both the support rods 42 and 44 to extend therethrough, and mounting flanges, all indicated at 50, attach to bellows, all indicated at 52, are provided at each of the ports 46 to seal against the support rods 42 and 44 to contain the vacuum in the interior of the vacuum housing 12. Note that for each of the support rods 42 and 44 there are two oppositely oriented bellows 52, one at the entrance end and one at the exit end of the vacuum housing. A series of outgassing holes 54 are provided in each of the support rods 42 and 44 so that material in the hollow interiors of the rods can freely outgas into the interior of the vacuum housing 12. At their left hand end, as viewed in FIG. 5, which is the entrance end of the instrument, each of the bellows 52 is secured to respective one of upper and lower drive mounts 56 and 58. Each of the drive mounts 56 and 58 is mounted on a respective one of two air bearings 60 and 62 which are provided so that the drive mounts can be freely translated forwardly and rearwardly along the air bearing surfaces 22 and 24 without friction. Each of the drive mounts 56 and 58 includes a respective one of a pair of drive shaft followers 64 and 66 which are each entrained on a respective one of the drive shafts 38 and 40, and which also seal the vacuum contained in the interior of the associated bellows 52. A pair of flanges 68 and 70 are formed at the front end of each of the support rods 42 and 44 and secured to the drive mounts 56 and 58 so that motion of the drive mounts is transferred to the respective support rods 42 and 44. At their ends opposite from the drive mounts 56 and 58, the support rods 42 and 44 are provided with similar flanges 72 and 74 which are secured to follower mounts 76 and 78. The respective follower mounts 76 and 78 are secured to air bearings 80 and 82 resting on the air bearing surfaces 22 and 24 so as to freely follow the motion from the drive mounts 56 and 58.

As can be seen from the cross-sectional view of FIG. 4, a pair of arcuate fittings 84 and 86 are positioned around the support rods 42 and 44 such that the fittings 84 and 86 can be firmly bolted to correspondingly shaped carousel mount fittings 88 and 90. Firmly mounted on each of the carousel mount fittings 88 and 90 are respective carousel mounts 92 and 94, as may also be seen in FIG. 5. Respective carousel assemblies, generally indicated at 100 and 102 respectively, are illustrated in FIGS. 4 and 5. These carousel assemblies 100 and 102 are carried on the respective carousel mounts 92 and 94 and therefore also on the support rods 42 and 44.

Figure 7:
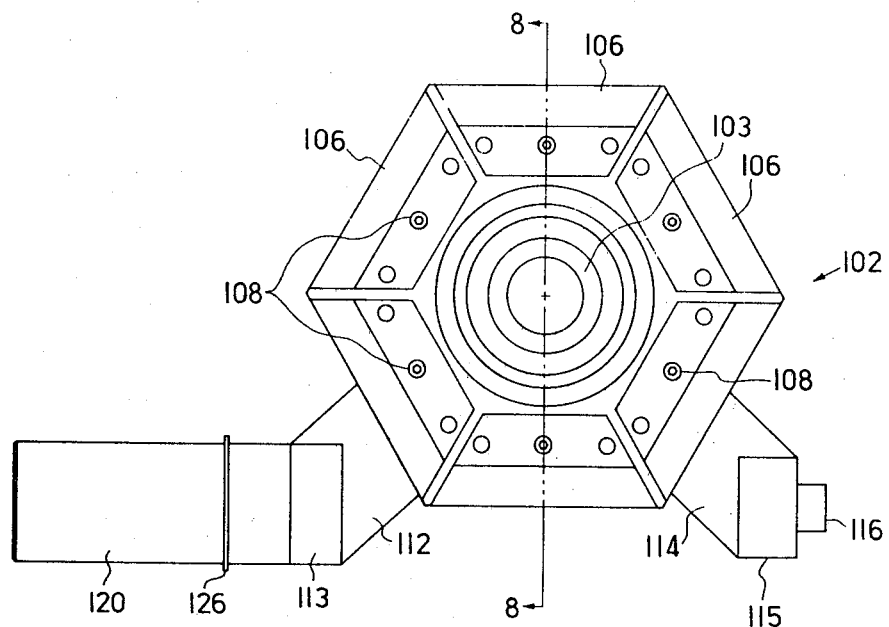
FIG. 7 is an enlarged front elevational view of a carousel utilized in the monochromator of FIGS. 3-6.
Figure 8:
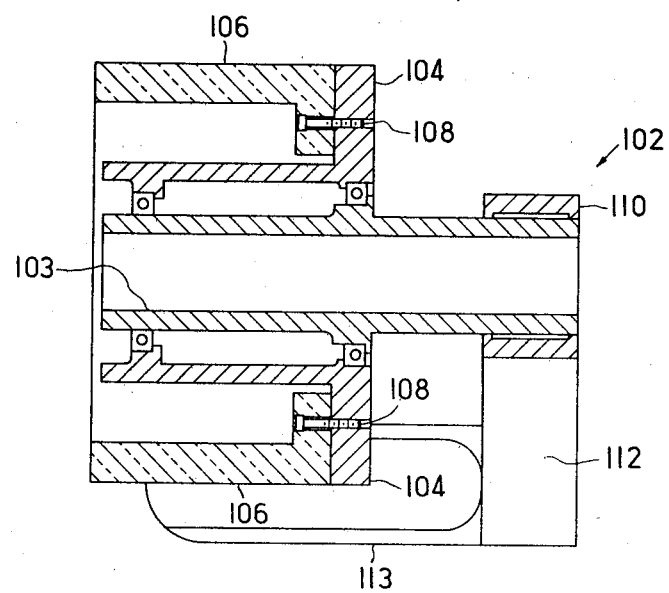
FIG. 8 is a cross-sectional view taken along the line 8—8 of FIG. 7.

Referring in detail to the components of the carousel assemblies 100 and 102, reference should be had to FIGS. 7 and 8 as well as FIGS. 4 and 5. FIGS. 7 and 8 illustrate the details of the carousel assembly 102, but it should be understood that the carousel assembly 100 is similar in construction and the parts thereof have been given similar reference numerals for similar parts thereof. The carousel assembly 102 includes a longitudinally extending hollow cylindrical shaft 103. Mounted on rotational bearings around the shaft 103 is the optical element carousel 104. The optical element carousel base 104 includes a cylindrical portion surrounding the forwardmost portion of the shaft 103 and an outwardly extending hexagonal base portion located in a plane perpendicular to the axis of the shaft 103. The bearing mount of the carousel 104 on the shaft 103 allows the carousel 104 to freely rotate around the shaft 103. Mounted on the carousel 104 are six optical elements 106, one located on each of the six sides of the base portion of the carousel 104. Each of the optical elements 106 may be either diffraction gratings or diffraction crystals, depending upon the range of wavelengths desired from use of the instrument. The optical elements 106 are constructed to be of an L-shaped configuration so that the short leg of the L may be secured by an appropriate bolt 108 or other fastening means to the carousel 104. Suitable adjusting mechanisms may be provided in the fastening means 108 to permit exact and critical placement of the optical elements 106 on the carousel 104. At its rearward end, the cylindrical shaft 103 is fixed inside of a fitting 110. Extending outwardly from the fitting 110 are a pair of support legs 112 and 114. The support legs 112 and 114 are in turn connected to forwardly extending arms 113 and 115, one of which may be viewed in FIG. 8. Attached to the arm 115 is an outwardly extending pin 116, which is adapted to be received inside of a rotational bearing 118 (not shown in detail) mounted inside of upstanding side portions formed each of the respective carousel mounts 92 and 94. It can be seen by referring to FIG. 4 that each of the carousel mounts 92 and 94 includes side portions which upstand therefrom. One of the side portions of each of the mounts 92 and 94 includes the bearing 118.

Referring again to FIG. 7, it can be seen that the arm 113 of the carousel assembly 102 is attached at its end to a shaft 120 which extends outwardly in the direction opposite from the pin 116. The shaft 120 is received inside of a rotational bearing 122 (not shown in detail), mounted in the opposite side portion of each of the carousel mounts 92 and 94. A retaining ring 126, in the shape of an annular extension of the shaft 120, is formed to retain the shaft 120 in position. At the end of the shaft 120, a rotational drive wheel 128 is fixed to the shaft 120 as will be described later in greater detail. Outboard of the rotational drive wheel 128 a series of three interferometry arms 130, 132 and 134 are mounted on an extension 124 of the shaft 120. On each of the interferometry arms 130, 132, and 134, a pair of interferometry cubes, designated 136, 138, and 140, respectively, are mounted thereon. The arms 130, 132, and 134 are fixed to the shaft extension 124 so as to follow the rotational movements of the shaft 120. Suitable transparent optical viewing windows (not shown) are provided on the vacuum housing 12 so that coherent light beams can be directed into the interior of the vacuum housing 12 to strike the interferometry cubes 136, 138, and 140, so that light returned therefrom may be sensed by sensors located on the exterior of the housing 12.

Figure 6:
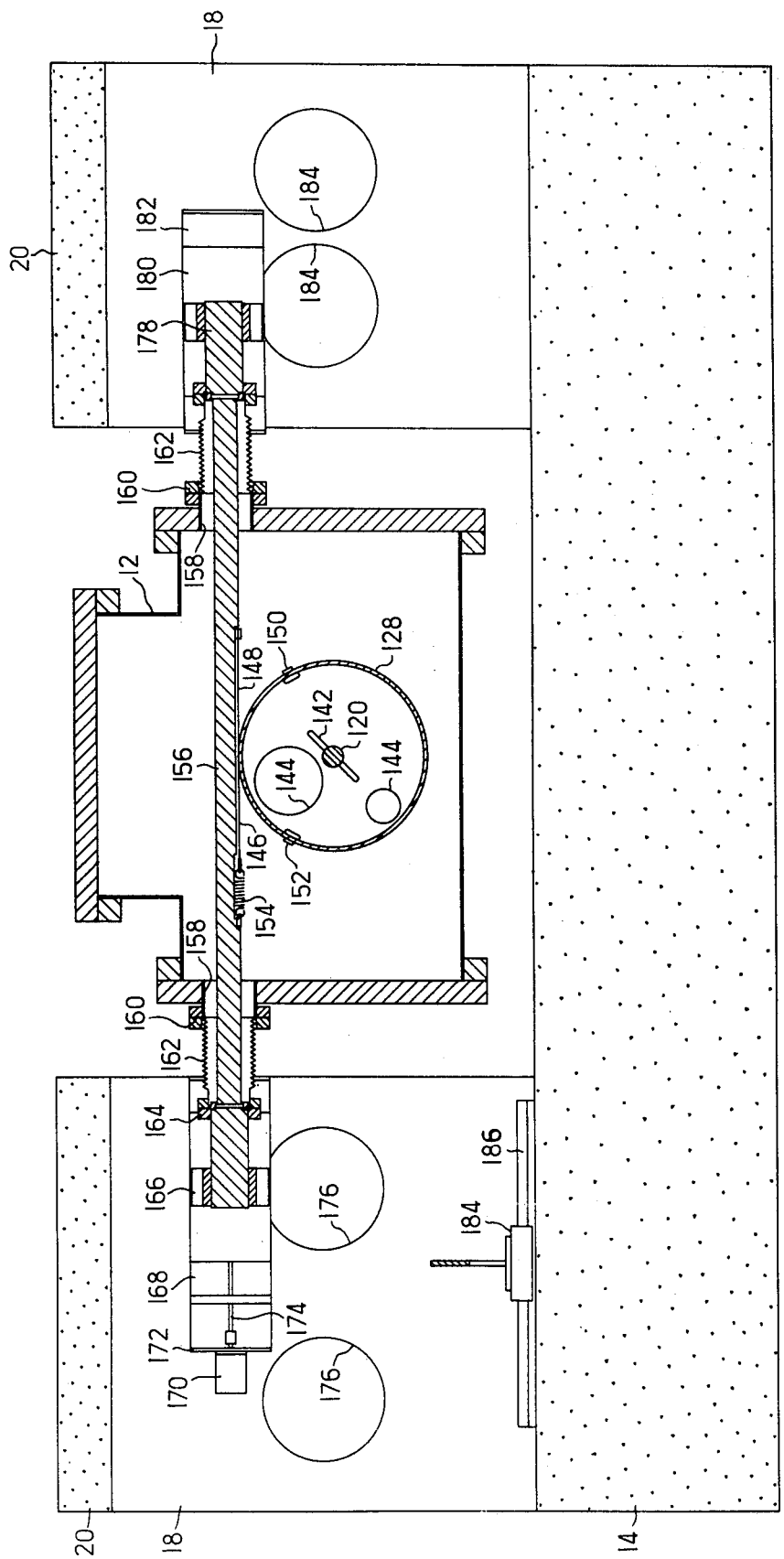
FIG. 6 is a cross-sectional view taken along the line 6—6 in FIG. 4.

There are two of the rotational drive wheels 128, one attached to each of the carousel assemblies 100 and 102 They are similar and although only one drive wheel 128 is shown in FIG. 6, it is to be understood that the other drive wheel 128 is similar. The drive wheel 128 has a centrally located aperture 142 which is clamped on the shaft 120. A pair of cut-outs 144 are provided in the drive wheel 128 to counterbalance the weight of the carousel assembly so that the drive wheel 128 can be easily rotated. A pair of drive tapes 146 and 148 are wrapped around the periphery of the drive wheel 128 and have their ends secured to the edge of the drive wheel 128 by respective fasteners 150 and 152. The end of the drive tape 146 is attached to one end of a tension spring 154 the other end of which is secured to a rotational drive rod 156. The other drive tape 148 has its other end secured directly to the drive rod 156. The drive rod 156 itself is an elongated solid cylindrical rod having a cut-out portion formed on its lower surface to accommodate the drive tapes 146 and 148. A pair of ports both indicated at 158 are formed in the vacuum housing 12 so that the drive rod 156 and extend therethrough. Each of the ports 158 includes a flange 160 attached to one of a set of oppositely oriented bellows 162. The set of bellows 162 at the left hand side of FIG. 6, the entrance side of the instrument, is attached to a drive block 164 attached to a slide bearing 166 mounted on a slide table 168 which is in turn mounted on the side portion 18 of the end assembly 16. A stepping motor 170 is mounted on a bracket 172 also secured to the side portion 18 and has a drive shaft connected through a coupling to a slide shaft 174. A pair of access holes 176 are provided in the side portion 18 so access to this assembly can be had. At its other end, which is the exit end of the instrument, the drive rod 156 is secured to a follower block 178 mounted on a slide bearing 180 which travels along a slide table 182. A similar pair of access holes 184 are provided in the side portion 18 at this end of the instrument. Also shown in FIG. 6 is an air bearing 184 upon which is mounted a bearing bracket 186 which is attached to the drive block 58 of the support rod 44 shown in FIG. 5.

Figure 9:
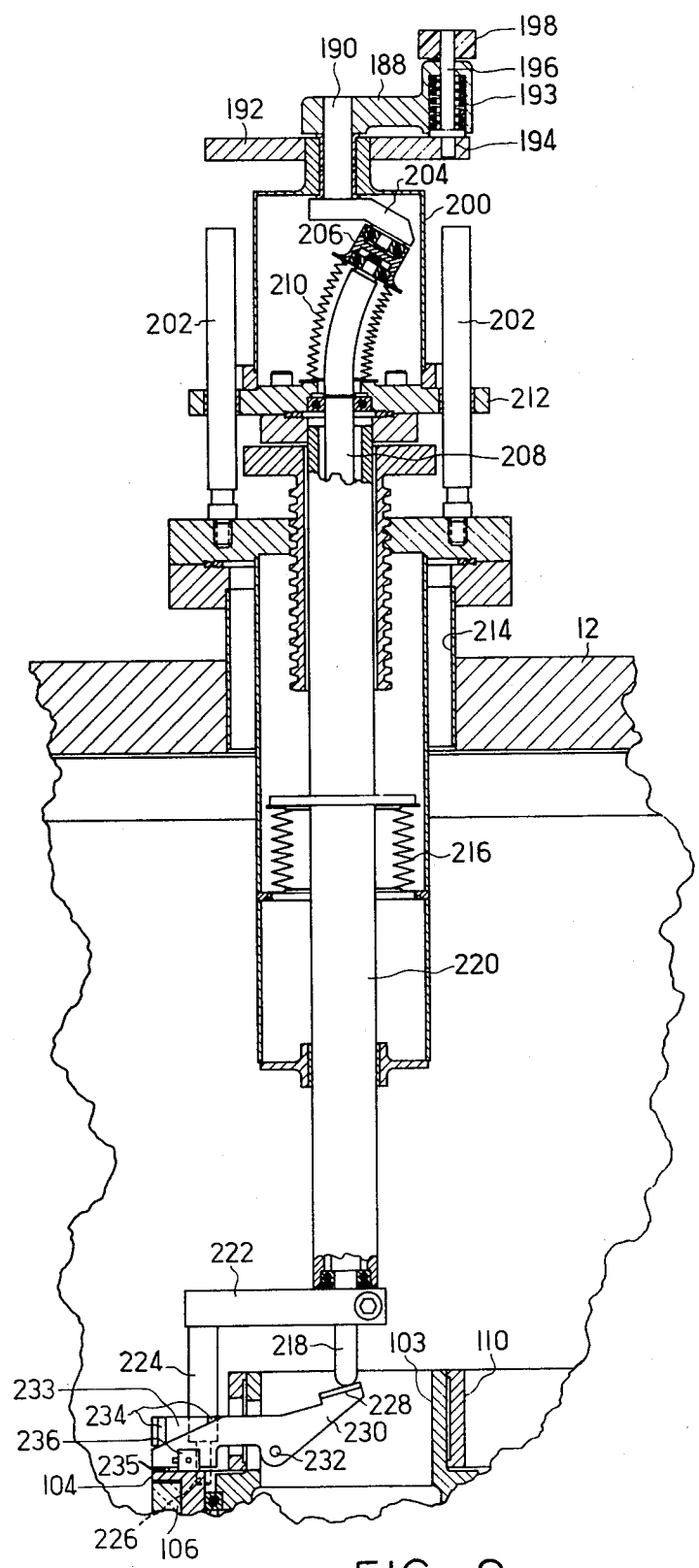
FIG. 9 is a cross-sectional view taken through the mechanism for turning the carousel illustrated in FIGS. 7-9.

Shown in FIG. 9 is a hand-operated carousel rotating mechanism usable to rotate the carousels 104 in the carousel assemblies 100 and 102. One of these mechanisms is provided for each of the carousel assemblies 100 and 102. The carousels 104 of the carousel assemblies 100 and 102 may be rotated either by a stepping motor located entirely inside of the vacuum chamber 12, or by the mechanism illustrated in FIG. 9. In that mechanism, a hand-operated crank 188 is mounted on a crank shaft 190. The crank shaft 190 passes through a plate 192 having a series of registration holes 194 formed in it. A pin 196 extending through the end of the crank 188 is biased toward the plate 192 by a compression spring 193 so as to potentially enter one of the holes 194. A handle 198 is provided at the end of the pin 196 so that it can be manually pulled against the force of the spring 193. The crank shaft 190 extends into a shaft housing 200 which is entrained on a pair of vertical rods 202 so that it can move vertically up and down. The end of the crank shaft 190 is connected to one end of an arm 204 the other end of which is connected through a bearing fitting 206 to one end of a feed through rod 208. The end of the feed through rod 208 is curved before its connection to the fitting 206 and is enclosed in a set of bellows 210. A bottom plate 212 secures the lower end of the bellows 210 and includes a rotational bearing through which the feed through rod 208 extends. The feed through rod 208 is then received in a shaft housing 220 which passes through a port 214 formed in the vacuum housing 12 and a set of bellows 216 into the interior of the housing 12.

At its lower end the feed through rod 208 has an elongated finger 218 which extends through a set of bearings located in the lower end of the shaft housing 220. A turning arm 222 is clamped on the finger 218 extending outward therefrom perpendicular to the shaft 208. At the other end of the turning arm 222 a downwardly extending rod 224 is attached which terminates at its lower end with a carousel engaging turning pin 226. The bottom end of the finger 218 contacts a flange 228 formed on a flag 230. The flag 230, which extends through suitable apertures provided in the shaft 103 and the fitting 110, is pivoted on a axle pin at 232. An adjustment pin 235 provided in the back of the carousel 104 is used to adjust the clearance of the flag 230 from the carousel 104. A series of upstanding ears 236 are provided on the back of the carousel 104, there being one of the ears 236 for each of the optical elements 106. Adjusting screws are provided in the ears 236 for fine adjustment of the position of the end of the flag 230 relative to the carousel base 104. A wound spring (not shown) is attached to the carousel 104 to rotationally bias the carousel so that the ear 236 tends to be forced against the flag 236. A retaining flap 233, extending from the fitting 110, has attached to it a pair of spaced downwardly extending pins 234 against which the flag 230 is pressed. The pins 234 are spaced so that the ears 236 can fit between them as the carousel 104 rotates.

Figure 1:
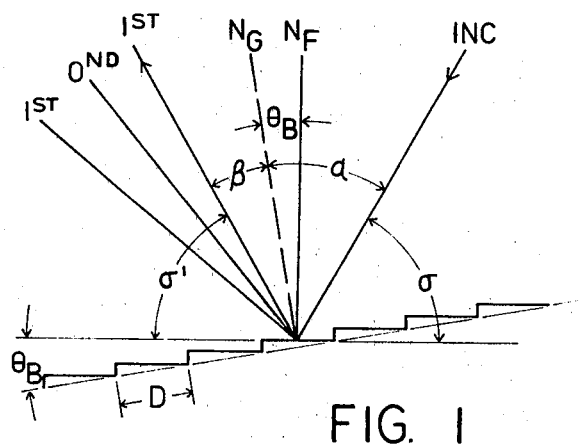
FIG. 1 is a schematic illustration of the blaze condition for light incident on a diffraction grating.
Figure 1A:
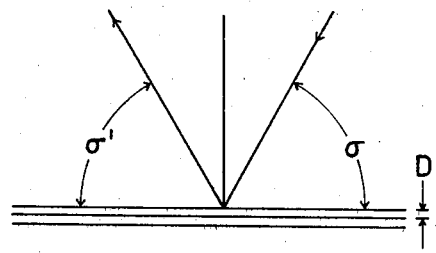
FIG. 1A is a schematic illustration, similar to FIG. 1, of the blaze condition for a diffraction crystal.
Figure 2:
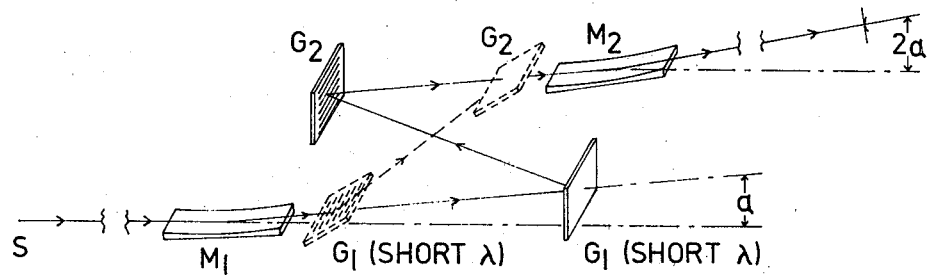
FIG. 2 is a schematic illustration of the optical path of light through a monochromator constructed in accordance with the present invention.

In its operation, the monochromator 10 of FIGS. 3-8 forms an optical instrument operating in the fashion illustrated by the schematic version of the optical path as illustrated in FIG. 2. Light from the source S, typically a synchrotron, is gathered by a mirror $M_1$, located in front of the entrance to the monochromator 10 and is aimed toward the first optical element, designated $G_1$. The two optical elements designated $G_1$ and $G_2$ in FIG. 2 are functional equivalent of a pair of optical elements 106, one from each of the carousel assemblies 100 and 102. Each of the carousels 100 and 102 may be translated and rotated such that the particular optical element 106 then inserted into the optical path can move between the positions designated $G_1$ (SHORT $\lambda$) and $G_1$ (LONG $\lambda$), and $G_2$ (SHORT $\lambda$) and $G_2$ (LONG $\lambda$) respectively. The selected wavelength of radiation is directed by a mirror $M_2$, located outside of the instrument, toward the desired target. The optical elements 106, or $G_1$ and $G_2$ are configured in an arrangement to give use to a blaze condition so that the intensity of the output radiation is at a maxium. Thus only one of the optical elements 106 from each of the carousel assemblies 100 and 102 is actually used in the instrument at any one time. By providing multiple optical elements 106 on each carousel 104, and by providing a mechanism for changing the selection of which element is inserted into the optical path, it is possible to use gratings and crystals, or both, of varying optical characteristics in the monochromator.

The monochromator 10 is intended to operate under the control of an external electronic digital controller, typically a digital computer. In a method well documented in the art, coherent light beams are projected into the vacuum housing 12, to be reflected by the six pairs of interferometry cubes, 136, 138 and 140, so that the position of the reflected light beams can be detected on the outside of the housing 12 to indicate the position and rotational orientation of the carousel assemblies 100 and 102. This positional information is processed by the digital controller to generate signals which operate the two translational positioning stepping motors 26 and 28 and the two rotational positioning stepping motors 170 to properly adjust the translational position and rotational orientation of the two carousel assemblies 100 and 102 to thereby properly adjust the optical elements 106 for blaze operation at the desired frequency. By properly varying the position and rotation of the carousel assemblies 100 and 102, and thereby the optical elements 106, the instrument can also scan through a bandwith of radiation while constantly maintaining a blaze condition. If the spectral range of a particular set of optical elements 106 is exceeded, the carousel turning mechanisms, one of which is shown in FIG. 9, can be used to rotate each carousel 104 to change the pair of the optical element 106 on each carousel 104 which is placed in the optical path of the instrument. Thus the spectral range of the instrument is expanded, potentially six-fold, and both crystals and gratings can alternatively be utilized in the instrument without the need to break the vacuum in the housing to switch operation between them.

Translational positioning of the carousel assemblies 100 and 102 is accomplished by the two respective translational positioning mechanisms illustrated in FIG. 5. The stepping motors 26 and 28, operated by the digital controller, rotate to thereby rotate the threaded drive shafts 38 and 40. The rotations of the threaded shafts 38 and 40 causes the followers 64 and 66 to linearly move forwardly and backwardly, thereby moving both the drive blocks 56 and 58 and the support rods 42 and 44. The assembly of the support rods 42 and 44 and the associated drive blocks 56 and 58, and associated follower blocks 76 and 78, slide freely on the bearings 60, 62, 80 and 82. Since the carousel mounts 92 and 94 are mounted directly on the support rods 42 and 44, these translational movements are transferred directly to the carousel assemblies 100 and 102. The air bearings 184 and brackets 186 are provdied to compensate for any angular moment which may be experienced on the support rods 42 and 44.

Rotational positioning of the carousel assemblies 101 and 102 is accomplished by the two respective rotational positioning mechanisms, one of which is illustrated in FIG. 6. The stepping motor 170, operated by the digital controller, rotates to thereby rotate the drive shaft 174. The rotation of the threaded drive shaft 174 causes the slide bearing 166 to move forwardly and backwardly along the axis of the drive shaft 174 so that the entire rotational drive rod 156 is driven forwardly and backwardly by the stepping motor 170. The follower block 178 follows the movement of the drive rod 156 as its slide bearing 180 slides on the table 182. Linear positional changes of the rotational drive rod 156 are converted to rotational motions of the wheel 128 by the drive tapes 146 and 148 which provide the mechanical linkage between the drive rod 156 and the drive wheel 128. The spring 154 insures that the tapes are always in proper tension. Rotational movements of the drive wheel 128 are transmitted by the shaft 120, to which it is fixed, to rotate the leg 122 of the carousel assembly to pivot the entire carousel assembly 100 or 102 to which it is attached. The particular rotational positioning mechanism illustrated in FIG. 6 serves to rotationally position the carousel assembly 102, as can be viewed in FIG. 4. Clearly if the rotational drive shaft 156 is not moved while the support rod 44 carrying the carousel assembly 102 is translated, some rotational motion of the carousel assembly 102 will naturally occur as one of the drive tapes 146 or 148 pulls on the drive wheel 128 as the drive wheel 128 translates with the carousel assembly 102. At such time as the translational motion is finished, however, it is then necessary to properly rotationally adjust the carousel, and thereby the optical element 106 in the carousel 104, by appropriate movement of the rotational drive shaft 156 to properly rotate the carousel 102 as desired. By properly varying and controlling the motion of the translational and rotational positioning mechanisms at the same time, it is possible to smoothly move the optical elements 106 so as to scan through a range of wavelengths.

At all times through the translation and rotation of the carousel assemblies, the pairs of interferometry cubes located on the arms 130, 132, and 134 provide a instantaneous indication of the exact translational position and rotational orientation of the carousel assemblies and thereby the optical elements thereon. Since the translational position and rotational orientation of the two carousel assemblies 100 and 102 can be accurately and independently determined and then set, and since their positions can always be constantly checked through the use of the interferometry cubes, exact and critical placement of the optical elements at any one position through a continuous range is thereby always possible. In this fashion, it is possible to insure that the optical elements 106 are maintained in a precise orientation so as to obtain blaze condition operation at whatever wavelength the instrument is handling at a given time.

Shown in FIG. 9 is a mechanism for rotating one of the carousel assemblies. It is to be understood that it would be desirable to provide a mechanism inside of the vacuum housing 12, controllable from outside thereof, which is automatically capable of rotating the carousel assemblies 100 or 102. Such a mechanism would potentially take the form of an ultra-high vacuum stepping motor. Alternatively, the mechanism of FIG. 9 provides a mechanical linkage to the exterior of the vacuum housing 12 which can be utilized to turn the carousel. To utilize the mechanism, the carousel assembly must be translated to a position where the central axis of the shaft 103 is parallel with the central axis of the feed through rod 208. Rotation of the carousel can only occur at this one position, which is illustrated in FIG. 9. Once the carousel assembly is in position, the user can depress the handle 188 thereby pushing downward on the feed through rod 208 and causing the finger 218 to engage the flag 230, as is indicated in FIG. 9. Further depression of the handle causes the flag 230 to be pivoted about the pivot point 232. At the same time as the turning pin 226 engages a corresponding hole located on the back of the carousel 104. When the flag 230 is pivoted sufficiently so that it can clear the adjacent ear 236, and with the rotational pin 226 engaging the carousel 104, the handle 188 can then be rotated thereby also rotating the carousel 104. At the appropriate position for the next optical element 106, the pin 196 in the handle 188 engages the next hole 194 in the plate 102 which is designed to correspond in position to a rotation of one optical element of the carousel assembly. When the pressure on the handle 188 is released, and the feed through rod 208 raises, the flag 230 returns to its original position thereby again being pressed between the ear 236 and the flap 233. The ears 236 are provided with screws so as to provide a side engaging mechanism to properly position the carousel 104 relative to the flag 230. The width of the ear 236 allows it to pass between the pins 234 on the flap 233 as the carousel 104 rotates. Thus the mechanism illustrated in FIG. 9 functions as a carousel rotating mechanism to allow rotation of the carousel to change which of the optical elements 106 which is inserted into the optical path of the instrument by mechanical actuation from outside of the vacuum housing 12.

Thus by using the monochromator of the present invention, it is possible to mix crystal optical elements with grating optical elements in the same monochromator, for alternate use. Since the carousel assemblies 100 and 102 can be rotated without breaking the vacuum in the housing 12, it is not only possible to continuously scan through the frequency ranges of each element, it is relatively simple to change optical elements 106 once the limit of a particular optical element is reached during a scan. Since the rotational position of the carousel assemblies 100 and 102, and thereby the optical elements 106, is always independently adjustable, blaze condition can be maintained throughout the entire spectral range of the instrument. Since all of the positioning of these optical elements is under complete and absolute independent external control by the digital controller, precise and accurate programmed scanning can occur over a wide range. All of these features are accomplished while maintaining an ultra-high vacuum to maintain a maximum intensity in the output radiation.

Another advantage of the monochromator of the present invention is the fact that each set of bellows on each of the positioning rods passing into the vacuum chamber 12 is balanced by another, opposed set of bellows. This design feature insures that the effect of atmospheric pressure n the positioning mechanism, which might otherwise vary, is constantly balanced. Thus each of the support rods 42 and 44 and the drive rods 156 has a pair of opposed bellows 52 and 162 so that such pressure variations are balanced on each mechanism.

It is to be understood that the present invention is not limited to the particular embodiments disclosed and illustrated herein, but embraces all such modified forms thereof as come within the scope of the following claims.

We claim:

1. A scanning monochromator capable of operating in an ultra-high vacuum under external control, the monochromator comprising:

a pair of optical element carousel assemblies (100, 102) each carrying a plurality of optical elements (106) only one of which is in the optical path of the monochromator at any time;

a translational positioning mechanism for selectively positioning each of the carousel assemblies (100, 102);

a rotational position mechanism for selectively rotating each of the carousel assemblies (100, 102) to change the orientation of the optical element (106) in the optical path; and a carousel rotating mechanism for rotating each of the carousel assemblies (100, 102) to change the one of the optical elements (106) of each carousel assembly (100, 102) which is in the optical path of the monochromator.

2. A monochromator as claimed in claim 1 wherein each of the translational positioning mechanisms includes a respective elongated support rod (42, 44) upon which each respective carousel assembly (100, 102) is carried, translational movement of the support rod (42, 44) carrying the respective carousel assembly (100, 102) with it.

3. A monochromator as claimed in claim 2 wherein each of the translational positioning mechanisms further includes a respective stepping motor (26, 28), a threaded drive shaft (38, 40) rotated by the stepping motor, and a follower (64, 66) secured to the respective support rod (42, 44) and threaded on the shaft to convert rotational movement of the respective drive shaft (38, 40) to linear movement of the support rod (42, 44).

4. A monochromator as claimed in claim 1 wherein each of the rotational position mechanisms includes a circular drive wheel (128) attached to each carousel assembly (100, 102) so that rotation of the drive wheel (128) rotates the respective carousel assembly (100, 102) to change the orientation of the optical element (106) in the optical path.

5. A monochromator as claimed in claim 4 wherein each of the rotational position mechanisms further includes a drive rod (156) mounted for linear movement and linked to the drive wheel (128) so that linear movement of the drive rod (156) causes rotational movement of the drive wheel (128).

6. A monochromator as claimed in claim 5 wherein the drive rod (156) is linked to the drive wheel (128) by a pair of drive tapes (146, 148).

7. A monochromator as claimed in claim 5 wherein each of the rotational positioning mechanisms further includes a stepping motor (170) the rotational movement of which is converted into linear movement of the drive rod (156).

8. A monochromator as claimed in claim 1 wherein each of the carousel assemblies (100, 102) includes a central shaft (103) and a carousel (104) carrying the optical elements (106) which is rotatably mounted on the shaft (103).

9. A monochromator as claimed in claim 8 wherein the carousel rotating mechanism is connected to be capable of rotating the carousel (104) about the shaft (103).

10. A monochromator as claimed in claim 9 where registering means are provided for each of the rotational positions of the carousel (104) to hold the carousel (104) to fix the optical elements (106) in position.

11. A monochromator as claimed in claim 8 wherein there are six of the optical elements (106) on each of the carousels (104).

12. A monochromator as claimed in claim 8 wherein the shaft (103) is connected to one end of an arm (113) connected at its other end to a second shaft (120) connected to the, rotational positioning mechanisms.

13. A monochromator as claimed in claim 1 wherein the carousel assemblies (100, 102) are housed in a vacuum housing (12) and wherein a pair of opposed bellows (52, 162) are provided for each of the linear positioning mechanisms and the rotational position mechanisms as they pass through the housing (12) so as to counterbalance any changes in atmospheric pressure.

14. A monochromator as claimed in claim 1 wherein the optical elements (106) may be selected from the group of diffraction gratings, crystals, or both.

* * * * *